(12) United States Patent
Luck et al.

(10) Patent No.: US 8,992,165 B2
(45) Date of Patent: Mar. 31, 2015

(54) VARIABLE GEOMETRY TURBINE

(75) Inventors: David Andrew Luck, Huddersfield (GB); Stephen Edward Garrett, Huddersfield (GB); Arun Tamil Selvan Vijayakumar, Huddersfield (GB)

(73) Assignee: Cummins Turbo Technologies Limited, Huddersfield (GB)

(*) Notice: Subject to any disclaimer, the term of this patent is extended or adjusted under 35 U.S.C. 154(b) by 576 days.

(21) Appl. No.: 13/238,869

(22) Filed: Sep. 21, 2011

(65) Prior Publication Data

US 2012/0128471 A1 May 24, 2012

(30) Foreign Application Priority Data

Sep. 22, 2010 (GB) .................... 1015914.3
Feb. 17, 2011 (GB) .................... 1102737.2

(51) Int. Cl.
  *F01D 17/14* (2006.01)
  *F02B 37/18* (2006.01)
  *F02B 37/24* (2006.01)

(52) U.S. Cl.
  CPC ............ *F01D 17/143* (2013.01); *F02B 37/186* (2013.01); *F02B 37/24* (2013.01); *Y02T 10/144* (2013.01); *F05D 2220/40* (2013.01)
  USPC ............................ 415/158; 415/159; 415/166

(58) Field of Classification Search
  CPC .... F01D 17/143; F01D 17/167; F04D 29/464
  USPC .......... 415/148, 151, 157, 158, 159, 165, 166
  See application file for complete search history.

(56) References Cited

U.S. PATENT DOCUMENTS

| | | | |
|---|---|---|---|
| 4,571,154 A * | 2/1986 | Weber ........................... | 415/158 |
| 5,868,552 A | 2/1999 | McKean et al. | |
| 7,024,855 B2 | 4/2006 | Perrin et al. | |
| 2005/0008479 A1 | 1/2005 | Doring et al. | |
| 2008/0089782 A1 * | 4/2008 | Parker et al. .................. | 415/150 |
| 2008/0152484 A1 | 6/2008 | Fledersbacher et al. | |
| 2009/0277171 A1 * | 11/2009 | Fledersbacher et al. ........ | 60/602 |
| 2011/0173973 A1 * | 7/2011 | Cattani et al. .................. | 60/602 |

FOREIGN PATENT DOCUMENTS

| | | |
|---|---|---|
| EP | 2 037 084 | 3/2009 |
| EP | 2 148 043 | 1/2010 |
| GB | 2 408 779 | 6/2005 |

OTHER PUBLICATIONS

Search Report, GB1015914.3, UK Intellectual Property Office, Cummins Turbo Technologies Limited, Jan. 12, 2011.

* cited by examiner

*Primary Examiner* — Edward Look
*Assistant Examiner* — Danielle M Christensen
(74) *Attorney, Agent, or Firm* — Krieg DeVault LLP

(57) ABSTRACT

A turbine wheel mounted within a housing rotating about a turbine axis; a gas flow control passage upstream of the turbine wheel between a radial first surface of a movable wall member and a facing wall of the housing, the movable wall member comprising second and third surfaces opposing the first surface. The movable wall member moves in an axial direction to vary the size of the gas flow control passage. A first gas region of the turbine, being upstream of the gas flow control passage, includes a portion of the gas flow control passage; a second gas region of the turbine downstream of the gas flow control passage containing the turbine wheel; and a third gas region of the turbine downstream of the turbine wheel. The first gas region comprises the first and second surfaces, and the second gas region or third gas region comprises the third surface.

20 Claims, 8 Drawing Sheets

VARIABLE GEOMETRY TURBINE

RELATED APPLICATIONS

The present application is related to, and claims priority to United Kingdom Patent Application No. 1015914.3 filed on Sep. 22, 2010 and United Kingdom Patent Application No. 1102737.2 filed on Feb. 17, 2011, each of which are incorporated herein by reference.

The present invention relates to a variable geometry turbine and to a method of manufacturing a turbine.

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housing.

The turbine stage of a conventional turbocharger comprises: a turbine housing defining a turbine chamber within which the turbine wheel is mounted; an annular inlet passageway defined in the housing between facing radially extending walls arranged around the turbine chamber; an inlet arranged around the inlet passageway; and an outlet passageway extending from the turbine chamber. The passageways and chamber communicate such that pressurised exhaust gas admitted to the inlet flows through the inlet passageway to the outlet passageway via the turbine chamber and rotates the turbine wheel. It is known to improve turbine performance by providing vanes, referred to as nozzle vanes, in the inlet passageway so as to deflect gas flowing through the inlet passageway towards the direction of rotation of the turbine wheel.

Turbines of this kind may be of a fixed or variable geometry type. Variable geometry turbines differ from fixed geometry turbines in that the size of the inlet passageway can be varied to optimise gas flow velocities over a range of mass flow rates so that the power output of the turbine can be varied in line with varying engine demands.

Nozzle vane arrangements in variable geometry turbochargers can take different forms. In one type, known as a sliding "nozzle ring", the vanes are fixed to an axially movable wall that slides across the inlet passageway. The axially movable wall moves towards a facing shroud plate in order to close down the inlet passageway and in so doing the vanes pass through apertures in the shroud plate. The position of the nozzle ring relative to the shroud is adjustable to control the width of the inlet passageway. For instance, as gas flowing through the turbine decreases the inlet passageway width may also be decreased to maintain gas velocity and optimise turbine output. In an alternative arrangement vanes extend from a fixed wall through slots provided in a moving shroud plate.

The moving nozzle ring or shroud plate is generally supported on rods extending parallel to the axis of rotation of the turbine wheel and is moved by an actuator, which is operable to displace the rods in an axial direction. Various types of actuators may be used to move the nozzle ring or shroud plate including, for example, a pneumatic actuator or a motor and gear transmission which are generally mounted on the outside of the housing. The actuator may be coupled to the nozzle ring or shroud plate by a yoke fixed on a separately formed shaft that is received in journal bearings in the wall of the turbine housing. The yoke rotates with the shaft and defines two spaced apart arms which extend away from the shaft on opposite sides of the turbine axis to engage portions of the support rods that extend out of the housing into the neighbouring bearing housing. The end of each arm of the yoke has a pin that extends into a sliding block that is in turn received in a slot defined in a respective support rod. Operation of the actuator causes the yoke and shaft to pivot about the shaft axis such that the pins on the arms describe an arc of a circle and that in turn causes the blocks to move axially and slide vertically within the slots defined in the support rods. Axial movement of the nozzle ring or shroud plate can thus be achieved by rotation of the yoke about the shaft.

In applications where a smaller variable geometry turbocharger is required (e.g. for use on smaller engines or as a high pressure turbocharger in a two-stage system) there are space constraints and there is a need to reduce the size of the spatial envelope occupied by the turbocharger by making it more compact without impairing its performance.

Furthermore, variable geometry turbines comprising a movable shroud plate or a sliding nozzle ring may, in some applications, be difficult to actuate. This is because in some applications, when the movable shroud plate or sliding nozzle ring is in a position which is near to a closed position (i.e. where the turbine inlet passage is substantially closed), the moving shroud plate or sliding nozzle ring may experience a force which acts to try to move the moving shroud or sliding nozzle ring towards the closed position. The actuation of such turbines may require a complex, large, powerful actuator in combination with a complex linkage arrangement. Such an actuator and linkage arrangement may have a high financial cost.

It is one object of the present invention, amongst others, to provide for a compact turbocharger design. It is also an object to provide for an alternative or an improved variable geometry turbine. It is a further object to provide a variable geometry turbine which has improved actuation characteristics. It is a still further object of the invention to provide a turbine which comprises an actuator and/or linkage arrangement which is of reduced size, cost and/or complexity.

According to a first aspect of the present invention there is provided a variable geometry turbine comprising a turbine wheel mounted within a housing for rotation about a turbine axis; and a gas flow control passage upstream of said turbine wheel, the gas flow control passage being defined at least in part between a radial first surface of a movable wall member and a facing wall of the housing, the movable wall member also comprising second and third surfaces which oppose the first surface, the movable wall member being movable in an axial direction so as to vary the size of the gas flow control passage; there being a first gas region of the turbine, a portion of which is upstream of the gas flow control passage, the first gas region including at least a portion of the gas flow control passage, a second gas region of the turbine downstream of the gas flow control passage which contains the turbine wheel, and a third gas region of the turbine downstream of the turbine wheel; wherein the first gas region comprises the first and second surfaces, and the second gas region or third gas region comprises the third surface.

The second gas region may comprise the third surface and, in use, the pressure in the second gas region may be intermediate the pressure in the first and third gas regions.

The variable geometry turbine may additionally comprise gas flow control vanes which extend from the facing wall of the housing at least part way across the gas flow control passage; and wherein the movable wall member comprises a shroud plate, the shroud plate having a plurality of apertures, each aperture corresponding to a gas flow control vane and being configured such that, in use, it can receive the corresponding gas flow control vane.

The movable wall member may comprise a first substantially tubular portion, a second substantially tubular portion and an arm, the radius of the first substantially tubular portion being greater than the radius of the second substantially tubular portion, wherein a connection portion joins a first end of the first substantially tubular portion with a first end of the second substantially tubular portion; wherein the arm extends radially outboard of the second substantially tubular member from a second end of the second substantially tubular portion; wherein the radial first surface is defined by the arm, the second surface is defined by the arm, and wherein the third surface is defined by the connection portion.

The radius of the first substantially tubular portion may be greater than the radius of the radially innermost point of at least one of the gas flow control vanes; and the radius of the first substantially tubular portion is less than the radius of the radially outermost point of at least one of the gas flow control vanes.

The second gas region may comprise the third surface and wherein the second gas region further may comprise a link passageway, a first end of which is in gas flow communication with the turbine wheel and a second end of which is in gas flow communication with the third surface.

The link passageway may be defined between the movable wall member and a fixed annular wall portion of the housing.

The variable geometry turbine may additionally comprise a gas flow control mechanism operable to move the movable member to control gas flow through said gas flow control passage; the gas flow control mechanism comprising a non-linear linkage for connection between an actuator and the movable wall member.

The gas flow control mechanism may be located at least in part within the housing.

The linkage may be a four bar linkage.

The linkage may comprise a first link member, a second link member and a third link member; a first end of the first link member being fixedly linked to the actuator and a second end of the first link member being pivotally linked to a first end of the second link member, such that the first link member and second link member can rotate relative to one another; a second end of the second link member being pivotally linked to a first end of the third link member, such that the second link member and third link member can rotate relative to one another; a second end of the third link member being fixedly linked to a yoke member which is configured to axially move the movable wall member; wherein there is a constant fixed positional relationship between the first end of the first link member and the second end of the third link member.

The distance between the first and second ends of the first link member may be less than the distance between the first and second ends of the third link member. Optionally, the distance between the first and second ends of the first link member may be less than the distance between the first and second ends of the second link member, and the distance between the first and second ends of the second link member is less than the distance between the first and second ends of the third link member.

A toggle angle subtended by the first and second link members about the pivotal link between the first and second link members may be between at least one of 0° and about 25°, and about 15° and about 25°, when the movable wall member is in a closed position.

The non-linear linkage may be configured such that the force exerted on the movable wall member by the actuator per unit of torque of the actuator increases as the separation between the radial first surface of a movable wall member and a facing wall of the housing decreases.

The surface area of the third surface may be configured such that, in use, the net force acting on the movable member due to gas pressure acting on the movable wall member is substantially zero or urges the first surface of the movable wall member away from the facing wall of the housing.

The first gas region may comprise a turbine inlet volute and the third gas region may comprise a turbine outlet passageway.

The variable geometry turbine may further comprise an annular wall member having a radially inner surface which has a profile which corresponds to the outer profile of the turbine wheel and a radially outer surface which has a profile which corresponds to the profile of the third surface.

According to a second aspect of the present invention, there is provided a turbocharger comprising a variable geometry turbine according to the first aspect of the invention.

According to a third aspect of the present invention, there is provided a method of manufacturing or designing a variable geometry turbine according to the first aspect of the invention or a turbocharger according to the second aspect of the invention, wherein the method comprises calculating a surface area of the third surface such that, in use, the net force acting on the movable member due to gas pressure acting on the movable wall member is substantially zero or urges the first surface of the movable wall member away from the facing wall of the housing.

The method of manufacturing or designing a variable geometry turbine may further comprise forming the third surface with the calculated surface area.

According to a fourth aspect of the present invention, there is provided a variable geometry turbine comprising a turbine wheel mounted within a housing for rotation about a turbine axis; and a gas flow control passage upstream of said turbine wheel, the gas flow control passage being between a radial surface of a movable wall member and a facing wall of the housing, the movable wall member being movable in an axial direction so as to vary the size of the gas flow control passage, the variable geometry turbine further comprising a gas flow control mechanism operable to move the movable member to control gas flow through said gas flow control passage; the gas flow control mechanism comprising a non-linear linkage for connection between an actuator and the movable wall member.

The gas flow control mechanism may be located at least in part within the housing.

The linkage may be a four bar linkage.

The linkage may comprise a first link member, a second link member and a third link member; a first end of the first link member being fixedly linked to the actuator and a second end of the first link member being pivotally linked to a first end of the second link member, such that the first link member and second link member can rotate relative to one another; a second end of the second link member being pivotally linked to a first end of the third link member, such that the second link member and third link member can rotate relative to one another; a second end of the third link member being fixedly linked to a yoke member which is configured to axially move the movable wall member; wherein there is a constant fixed positional relationship between the first end of the first link member and the second end of the third link member.

The distance between the first and second ends of the first link member may be less than the distance between the first and second ends of the third link member. The distance between the first and second ends of the first link member may be less than the distance between the first and second ends of the second link member, and the distance between the first and second ends of the second link member may be less than the distance between the first and second ends of the third link member.

A toggle angle subtended by the first and second link members about the pivotal link between the first and second link members may be between at least one of 0° and about 25°, and about 15° and about 25°, when the movable wall member is in a closed position.

The non-linear linkage may be configured such that the force exerted on the movable wall member by the actuator per unit of torque of the actuator increases as the separation between the radial first surface of a movable wall member and a facing wall of the housing decreases.

According to a fifth aspect of the invention there is provided a variable geometry turbine comprising a turbine wheel mounted within a housing for rotation about a turbine axis; a gas flow control passage upstream of said turbine wheel, the gas flow control passage being defined at least in part between a radial surface of a movable wall member and a facing wall of the housing, the movable wall member being movable in an axial direction so as to vary the size of the gas flow control passage; and a gas flow control mechanism operable to move the movable member to control gas flow through said gas flow control passage; the gas flow control mechanism comprising a non-linear linkage for connection between an actuator and the movable wall member.

The non-linear linkage may be a four bar linkage.

The gas flow control mechanism may be located at least in part within the housing.

The linkage may comprise a first link member, a second link member and a third link member; a first end of the first link member being fixedly linked to the actuator and a second end of the first link member being pivotally linked to a first end of the second link member, such that the first link member and second link member can rotate relative to one another; a second end of the second link member being pivotally linked to a first end of the third link member, such that the second link member and third link member can rotate relative to one another; a second end of the third link member being fixedly linked to a yoke member which is configured to axially move the movable wall member; wherein there is a constant fixed positional relationship between the first end of the first link member and the second end of the third link member.

The distance between the first and second ends of the first link member may be less than the distance between the first and second ends of the third link member; and optionally the distance between the first and second ends of the first link member may be less than the distance between the first and second ends of the second link member, and the distance between the first and second ends of the second link member may be less than the distance between the first and second ends of the third link member.

A toggle angle subtended by the first and second link members about the pivotal link between the first and second link member may between at least one of 0° and about 25°, and about 15° and about 25°, when the movable wall member is in a closed position.

The non-linear linkage may be configured such that the force exerted on the movable wall member by the actuator per unit of torque of the actuator increases as the separation between the radial first surface of a movable wall member and a facing wall of the housing decreases.

A specific embodiment of the present invention will now be described, by way of example only, with reference to the accompanying drawings, in which.

Figure 1:
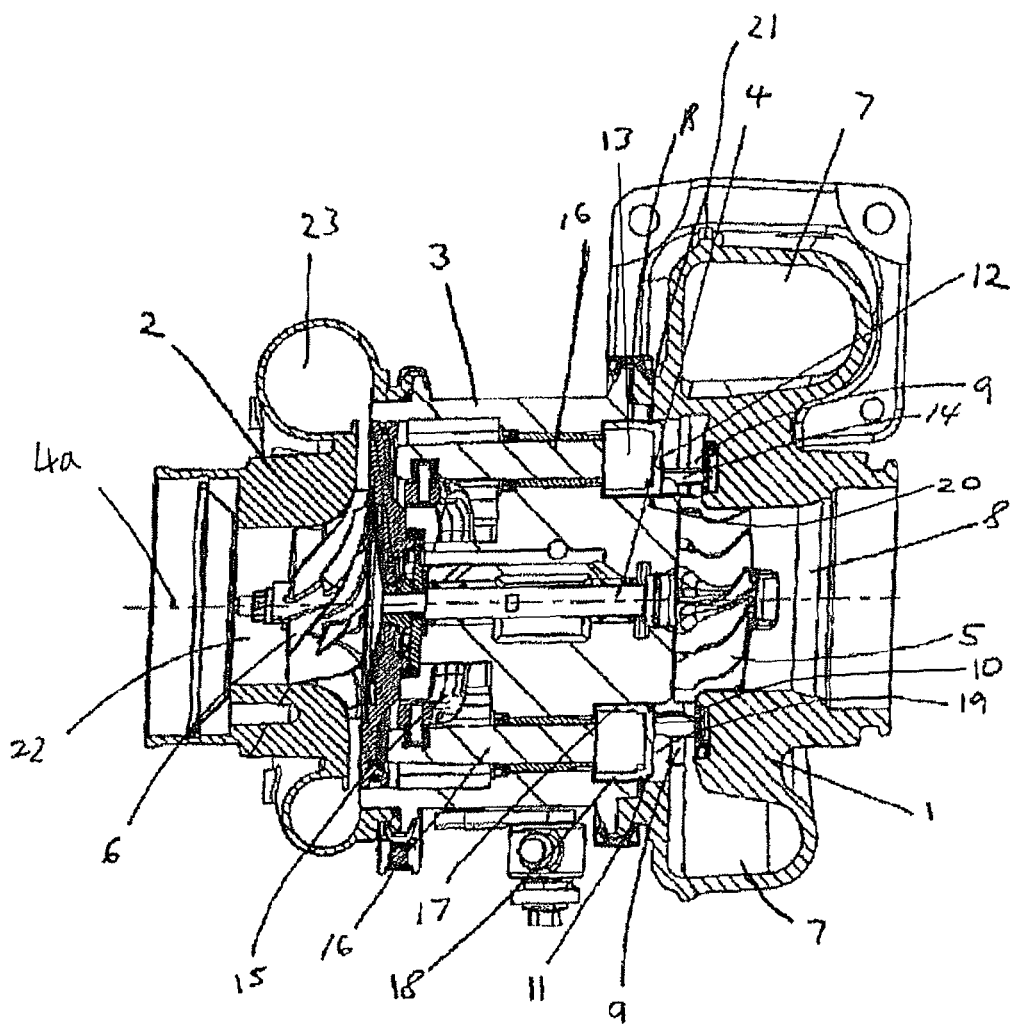
FIG. 1 shows a cross-sectional view of a turbocharger.

Referring to FIG. 1, this illustrates a known variable geometry turbocharger comprising a variable geometry turbine housing 1 and a compressor housing 2 interconnected by a central bearing housing 3. A turbocharger shaft 4 extends from the turbine housing 1 to the compressor housing 2 through the bearing housing 3. A turbine wheel 5 is mounted on one end of the shaft 4 for rotation within the turbine housing 1, and a compressor wheel 6 is mounted on the other end of the shaft 4 for rotation within the compressor housing 2. The shaft 4 rotates about turbocharger axis 4a on bearing assemblies located in the bearing housing 3.

The turbine housing 1 defines an inlet volute 7 to which gas from an internal combustion engine (not shown) is delivered. The exhaust gas flows from the inlet volute 7 to an axial outlet passageway 8 via an annular inlet passageway 9 and the turbine wheel 5. The inlet passageway 9 is defined on one side by a face of a radial wall of a movable annular wall member 11, comprising an annular shroud 12, and on the opposite side by a second wall member, also referred to as a nozzle ring 10, which forms the wall of the inlet passageway 9 facing the annular shroud 12. The shroud 12 defines an annular recess 13 in the annular wall member 11.

The nozzle ring 10 supports an array of circumferentially and equally spaced inlet vanes 14 each of which extends across the inlet passageway 9. The vanes 14 are orientated to deflect gas flowing through the inlet passageway 9 towards the direction of rotation of the turbine wheel 5. When the annular shroud 12 is proximate to the nozzle ring 10 the vanes 14 project through suitably configured slots in the shroud 12, into the recess 13.

The position of the annular wall member 11 is controlled by an actuator assembly of the type disclosed in U.S. Pat. No. 5,868,552. An actuator (not shown) is operable to adjust the position of the annular wall member 11 via an actuator output shaft (not shown), which is linked to a yoke 15. The yoke 15 in turn engages axially extending actuating rods 16 that support the annular wall member 11. Accordingly, by appropriate control of the actuator (which may for instance be pneumatic or electric), the axial position of the rods 16 and thus of the annular wall member 11 can be controlled. The speed of the turbine wheel 5 is dependent upon the velocity of the gas passing through the annular inlet passageway 9. For a fixed rate of mass of gas flowing into the inlet passageway 9, the gas velocity is a function of the width of the inlet passageway 9, the width being adjustable by controlling the axial position of the annular wall member 11. For a fixed rate of mass of gas flowing into the inlet passageway 9, the narrower the width of the inlet passageway 9, the greater the velocity of the gas passing through the inlet passageway 9. FIG. 1 shows the annular inlet passageway 9 fully open. The inlet passageway 9 may be closed to a minimum by moving the annular shroud 12 of the annular wall member 11 towards the nozzle ring 10. When the separation between the annular shroud 12 of the annular wall member 11 and the nozzle ring 10 is a minimum (such that the width of the inlet passageway is a minimum), the annular wall member 11 may be said to be in a closed position.

The annular wall member 11 has axially extending radially inner and outer annular flanges 17 and 18 that extend into an annular cavity 19 provided in the turbine housing 1. Inner and outer sealing rings 20 and 21 are provided to seal the annular wall member 11 with respect to inner and outer annular surfaces of the annular cavity 19 respectively, whilst allowing the annular wall member 11 to slide within the annular cavity 19. The inner sealing ring 20 is supported within an annular groove formed in the radially inner annular surface of the cavity 19 and bears against the inner annular flange 17 of the annular wall member 11. The outer sealing ring 20 is supported within an annular groove formed in the radially outer annular surface of the cavity 19 and bears against the outer annular flange 18 of the annular wall member 11.

Gas flowing from the inlet volute 7 to the outlet passageway 8 passes over the turbine wheel 5 and as a result torque is applied to the shaft 4 to drive the compressor wheel 6. Rotation of the compressor wheel 6 within the compressor housing 2 pressurises ambient air present in an air inlet 22 and delivers the pressurised air to an air outlet volute 23 from which it is fed to an internal combustion engine (not shown).

Figure 2:
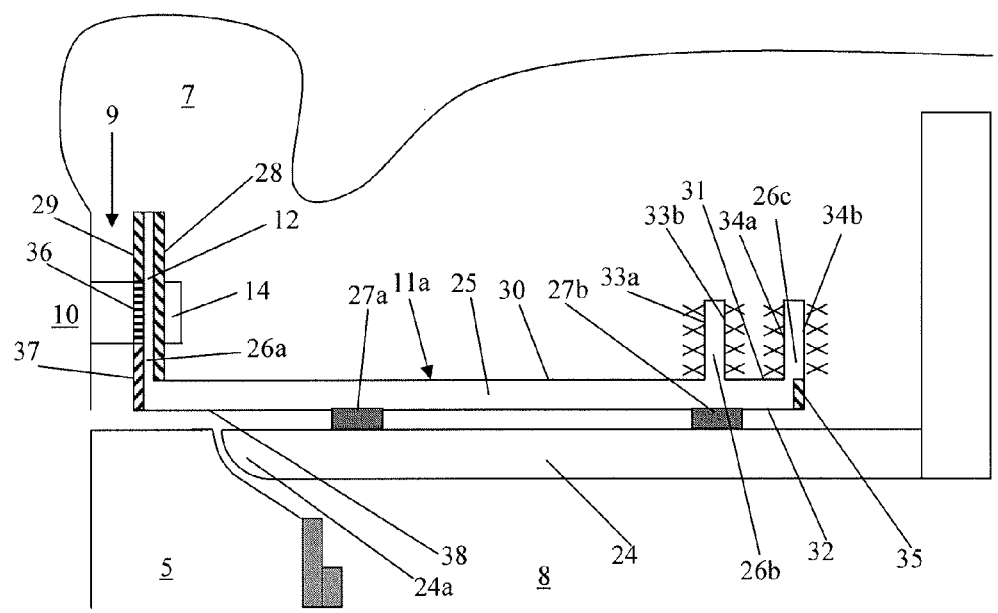
FIG. 2 shows a schematic cross-sectional view of a portion of a turbine.

FIG. 2 shows a schematic cross-sectional view of a portion of a turbine. In common with the turbine of the turbocharger shown in FIG. 1, the turbine shown in FIG. 2 has an inlet passageway 9 (also referred to as a gas flow control passage) defined between an annular shroud 12 of a movable annular wall member 11a and an annular nozzle ring 10. The configuration of the movable annular wall member 11a is different to the configuration of the movable annular wall member 11 shown in FIG. 1, as discussed in further detail at a later point. The inlet passageway 9 is located upstream of a turbine wheel 5 mounted to a turbine shaft (not shown). The annular wall member 11a and turbine wheel 5 are mounted within a turbine housing (not shown). The turbine shaft is supported by journal and thrust bearings, including appropriate lubricating systems, located within a central bearing housing (not shown in the figure, but located to the left of the turbine wheel 5 of the figure). The nozzle ring 10 supports an array of circumferentially spaced inlet vanes 14 each of which extends across the inlet passageway 9. The vanes 14 are orientated to deflect gas flow through the inlet passageway 9 towards the direction of rotation of the turbine wheel 5. When the annular shroud is proximate to the nozzle ring 10 the vanes 14 project through suitably configured slots in the shroud 12 (as shown within the figure).

An annular wall 24 is coaxial with the axis of the turbine wheel 5 and at least part of which is located between the turbine wheel 5 and the movable wall member 11a. The annular wall 24 has an end portion 24a which is adjacent the turbine wheel 5 and has a surface which has a profile that corresponds to the outer profile of the turbine wheel 5. Due to the fact that the profile of the surface of the end portion 24a of the annular wall 24 matches the outer profile of the turbine wheel 5, clearance between the turbine wheel 5 and the annular wall 24 is minimised. Minimising the clearance between the turbine wheel 5 and the annular wall 24 helps to prevent any loss in efficiency of the turbine which may occur due to gas leaking from the inlet passageway 9 upstream of the turbine wheel 5 to an outlet passageway 8 downstream of the turbine wheel 5, without contributing to the rotation of the turbine wheel 5. The annular wall 24 is mounted within the turbine housing (not shown). In some embodiments the annular wall 24 may be integrated with or form part of the turbine housing.

The annular movable wall member 11a has a generally E-shaped cross-section. The movable wall member 11a is mounted within the turbine housing (not shown) so that a main body 25 of the movable wall member 11a lies substantially parallel to the axis of rotation of the turbine wheel 5 (and, in this embodiment, parallel to annular wall 24). An annular flange and first and second arms 26b, 26c extend radially outwards from the main body 25. The flange 26e, which is closer to the turbine wheel 5 and nozzle ring 10 than the first and second arms 20e. 26b, comprises or forms the shroud 12. The first and second arms 26b and 26c form a pair of arms which extend from the opposite end of the main body 16 relative to the flange 26a. The first and second arms 26b, 26c may be mechanically linked to a linkage in order to move the movable wall member 11a relative to the nozzle ring 10. A pair of annular seals 27a and 27b are axially displaced from one another and are located between the annular wall 24 and the movable member 11a. The annular seals 27a and 27b are each supported within annular grooves (not shown) in the radially outer surface of the annular wall 24. The annular seals 27a and 27b form a substantially gas tight seal between the annular wall 15 and the movable member 11a.

An inlet volute 7 is located upstream of the inlet passageway 9 and the movable member 11a. The inlet volute 7 is in gas flow communication with several surfaces (which may include portions of surfaces) of the movable member 11a. These surfaces include: a rear facing (i.e. facing away from the nozzle ring 10) surface 28 of the flange 26a of the movable member 11a; a first portion 29 of a front facing (i.e. facing towards the nozzle ring 10) surface of the flange 26a of the movable member 11a; circumferential surfaces 30 and 31 which face radially outwards and are part of the main body 25 of the movable member 11a; circumferential surface 32 which is upstream of the seal 27b (i.e. is in the same gas region as the inlet volute 7) and is a radially inward facing surface of the main body 25 of the movable member 11a; front facing and rear facing surfaces 33a and 33b of the first arm 26b of the movable member 11a; front facing and rear facing surfaces 34a and 34b of the second arm 26c of the movable member 11a; and a rear facing surface 35 at the end of the movable member 11a which is opposite to the end at which the first arm 26a is located. The gas provided to the inlet volute 7 (which is in flow communication with all of the surfaces mentioned above) is at a relatively high pressure (referred to as a first pressure). All the surfaces above, which are in flow communication with the inlet volute 7 (and are hence exposed to gas of the first pressure) and are upstream of the vanes 14 within the inlet passageway 9, may be said to be in a first gas region. Gas at any location within the first gas region is in flow communication with gas at any other location within the first gas region.

As the gas passes through the inlet passageway 9 and interacts with the vanes 14 its pressure is reduced. As a result, a portion 36 of the front facing surface of the flange 26a of the movable member 11a, in the vicinity of the vanes 14, is exposed to a pressure which is reduced compared to the first pressure of the inlet volute 7. This reduced pressure will be referred to as a second pressure.

As the gas moves through the inlet passageway 9, once it has passed the vanes 14, its pressure is again reduced (i.e. the pressure of the gas whilst it is passing through the vanes 14 is greater than the pressure of the gas once it has passed through the vanes 14). It follows that the portion 37 of the front facing surface of the flange 26a of the movable member 11a is exposed to a pressure which is reduced compared to the second pressure experienced by the portion 36 of the flange 26a in the vicinity of the vanes 14. This reduced pressure relative to the second pressure will be referred to as a third pressure.

Once the gas has passed through the inlet passageway 9 it passes over the turbine wheel and into an outlet passageway 8. As the gas passes through (or adjacent to) the turbine wheel 5 its pressure decreases from the third pressure to the pressure in the outlet passageway 8. The pressure in the outlet passageway 8 may be atmospheric pressure. The pressure of the gas as it passes from the portion of the inlet passageway 9 which is at the third pressure through (or adjacent to) the turbine wheel 5 to the outlet passageway 8 will be referred to as a fourth pressure. The pressure of the gas as it passes from the third pressure portion of the inlet passageway 9 to the outlet 8 is not constant (i.e. the pressure of the gas reduces as it passes towards the outlet passageway 8). This means that the term "fourth pressure" is used to encompass a range of pressures which exist between the fourth pressure portion of the inlet passageway 9 and the pressure of the outlet passageway 8. The pressure of the outlet passageway 8 may be referred as a fifth pressure. It will be appreciated that the first pressure is greater than the second pressure, the second pressure is greater than the third pressure, the third pressure is greater than the fourth pressure, and the fourth pressure is greater than the fifth pressure.

It can be seen that a radially inward facing circumferential surface 38 of the main body 25 of the movable member 11a will be in flow communication with gas that is at the fourth pressure. The surface 38 of the movable member 11a is defined by the annular seal 27a (i.e. the surface 38 is upstream (to the left in the figure) of the annular seal 27a). The surface 38 can be said to be in a second gas region which is downstream of the inlet passageway 9, upstream of the outlet passageway 8, and contains at least part of the turbine wheel. Gas within the second gas region will be at the fourth pressure. Gas at any location in the second gas region will be in flow communication with gas at any other location in the second gas region.

The outlet passageway 8 can be said to be in a third gas region. The third gas region includes the outlet passageway 8 and is downstream of the turbine wheel 5. Gas within the third gas region will be at the fifth pressure. Gas at any location in the third gas region will be in flow communication with gas at any other location in the third gas region. The first, second and third gas regions may not overlap.

Within FIG. 2, the surfaces shaded with diagonal lines sloping down to the right may be said to be in the first gas portion and are exposed to gas at the first pressure. The surface 36 shaded with horizontal lines is exposed to gas at the second pressure and the surface 37 shaded with diagonal lines which slope upwards to the right is exposed to gas at the third pressure.

If a surface is exposed to a pressure then the pressure causes a force to be exerted on that surface perpendicular to the surface. It follows that the various pressures that the surfaces are exposed to cause forces to be exerted on each of those surfaces. As previously discussed, some of the surfaces of the movable member 11a are generally radial, whereas some of the surfaces are generally circumferential. Because the movable member 11a is mounted within the turbine housing such that it may move axially, any force which is exerted on one of the radial surfaces/surface portions of the movable member 11a will either urge the movable member 11a such that the shroud 12 moves towards the nozzle ring 10 (to thereby narrow the inlet passageway 9) or urge the movable member 11a such that the shroud 12 moves away from the nozzle ring 10 (thereby widening the inlet passageway 9). Any force which is exerted on a circumferential surface will not urge the movable member 11a to move axially and can therefore be ignored for the purposes of the present invention.

In the case of the movable member 11a shown in FIG. 2, the surfaces which experience a force (due to the pressure exerted on them) which urges the movable member 11a (and hence shroud 12) away from the nozzle ring 10 are: surface portions 29, 36 and 37 of the flange 26a of the movable member 11a; surface 33a of the first arm 26b of the movable member 11a; and surface 34a of the second arm 26c of the movable member 11a.

The surfaces portions of the movable member 11a which experience a force (due to the pressure exerted on them) which urges the shroud 12 of the movable member 11a towards the nozzle ring 10 are: surface 28 of the flange 26a of the movable member 11a; surface 33b of the first arm 26b of the movable member 11a; surface 34b of the second arm 26c; and the surface portion 35 at the end of the movable member 11a opposite to the flange 26a.

In order to determine the net axial force which is exerted on the movable member 11a, the individual forces acting on each of the radial surfaces must be summed. A surface or surface portion which experiences a force which urges the movable wall member 11a away from the nozzle ring 10 is said to oppose a surface which experiences a force which urges the movable wall member 11a towards the nozzle ring 10. When determining the net axial force on the movable wall member 11a due to forces which are exerted on two opposing surfaces, then the force exerted on one of the opposing surfaces is subtracted from the force exerted on the other opposing surface.

Due to the fact that the surface area of surface 33a is the same as that of the surface 33b, and due to the fact that they are opposing surfaces which are exposed to the same pressure, the net axial force on the movable wall member 11a due to the force exerted on each of the surfaces 33a and 33b sums to substantially zero. For this reason, the surfaces 33a and 33b are marked with crosses because the force exerted on one of them (due to the pressure the surface is exposed to) substantially 'cancels out' the force exerted on the other one (i.e. the total contribution of the forces acting on each of the surfaces to the net axial force on the movable member 11a can be substantially ignored). The same is true for surfaces 34a and 34b of the second arm 26c. It will be appreciated that if the surface areas of surfaces 33a and 33b (or 34a and 34b) were not the same, then the larger surface of 33a and 33b (or 34a and 34b) would have a greater force exerted on it than the smaller surface and as such the net force exerted on the movable wall member 11a due to the force exerted on each of the surfaces 33a and 33b (or 34a and 34b) would not sum to substantially zero.

The force exerted on a surface which is exposed to a gas at a particular pressure is equal to the product of the pressure that the surface is exposed to and the area of the surface. It can be seen that surface 28 of the flange 26a of the movable wall member 11a and surface portion 35 (which is located at the end of the movable member 11a opposite to the flange 26a), are both exposed to the first pressure i.e. the pressure of the gas flowing from the inlet volute 7. The surface 28 and surface portion 35 exert a force on the movable wall member 11a which urges the movable wall member 11a towards the nozzle ring 10.

Surface portion 29 of the flange 26a of the movable wall member 11a is also exposed to the first pressure (i.e. the pressure of the gas flowing from the inlet volute 7). However, the force exerted on surface portion 29 urges the movable wall member 11a away from the nozzle ring 10. Surface portions 36 and 37 of the flange 26a of the movable wall member 11a are exposed to the second pressure and the third pressure respectively. The pressure on each of these surfaces results in a force which also urges the movable wall member 11a away from the nozzle ring 10.

The sum of the product of the pressure exerted on surface 28 and its surface area; and the product of the pressure on the surface portion 35 and its surface area gives the total force exerted on the movable wall member 11a which urges the movable wall member 11a towards the nozzle ring 10. The sum of the products of the pressures on each of surface portions 29, 36 and 37 and their surface areas gives the total force on the movable wall member 11a which urges the movable wall member 11a away from the nozzle ring 10. In this example, the total force exerted on the movable wall member 11a which urges the movable wall member 11a towards the nozzle ring 10 is greater than the total force exerted on the movable wall member 11a which urges the movable wall member 11a away from the nozzle ring 10. This is because the pressure exerted on surface portions 36 and 37 is the second pressure and third pressure respectively, compared to, for example, the greater first pressure on the opposed surfaces (in this example surfaces 28 and 35). Because the total force exerted on the movable wall member 11a which urges the movable wall member 11a towards the nozzle ring 10 is greater than the total force exerted on the movable wall member 11a which urges the movable wall member 11a away from the nozzle ring 10, the net force exerted on the movable wall member 11a urges the movable wall member (and hence the shroud 12) towards the nozzle ring 10.

The fact that the movable wall member 11a (and hence the shroud 12) experiences a net force which acts so as to urge the movable wall member 11a towards the nozzle ring 10 may be disadvantageous in some applications. For example, it may mean that a larger actuator (which may be connected to the movable wall member 11a via the first and second arms 26b, 26c) is required to overcome the force on the movable member 11a. A larger actuator may be more expensive and therefore lead to an increase in the cost of a turbocharger having this structure. A larger actuator may take up more space and therefore increase the size of the turbine. This would be disadvantageous in applications where the space occupied by the turbine must be kept to a minimum. Furthermore, in some embodiments, the net force on the movable wall member 11a urging it towards the nozzle ring 10 may be relatively large when the movable wall member 11a is in a position such that the shroud 12 is very close to the nozzle ring 10 (i.e. when the inlet passageway 9 is almost closed). In this situation it may be difficult to accurately control the position of the movable wall member. It may also be difficult to prevent or avoid unintentional closure of the inlet. Furthermore, the pressure and force imbalance could lead to juddering, fluttering or oscillation of the movable member, for example, if the pressure of or through the inlet changes over time (e.g. due to intake from one or more exhaust manifolds of an engine that the turbine is connected to). This may lead to inefficient operation of the turbine under such conditions.

When comparing the turbine shown in FIG. 2 with the turbine of the turbocharger shown in FIG. 1, it can be seen that there is a difference between the configurations of the two. In the turbine of the turbocharger shown in FIG. 1, as previously discussed, the shroud is supported by the movable wall member 11. The movable wall member 11 is actuated from the bearing housing side of the movable wall member 11 via push rods 16. In comparison, the movable wall member 11a of the turbine shown in FIG. 2, is actuated from the turbine side via arms 26b and 26c of the movable wall member 11a. That is to say, the linkage via which the movable wall member 11a is actuated is located at least in part within the turbine housing and not the bearing housing. Furthermore, the movable wall member 11a of the turbine shown in FIG. 2 is located within the turbine housing (not the bearing housing) and the movable wall member 11a is actuated so that the shroud 12 moves towards the bearing housing so as to narrow the width of the inlet passageway 9. Locating the movable wall member 11a (and at least part of the linkage via which the movable wall member 11a is actuated) within the turbine housing (as opposed to within the bearing housing) may be advantageous in some applications because it may reduce the complexity of the bearing housing and also lead to a reduction in size in at least part of a turbocharger (or other turbomachine) of which the turbine forms part.

FIGS. 3 to 8 show a turbine according to an embodiment of the present invention which seeks to obviate or mitigate at least one of the problems described above or another problem relating to known turbines. In addition, the turbine according to the embodiment of the invention shown in FIGS. 3 to 8 seeks to provide an alternative turbine.

Figure 3:
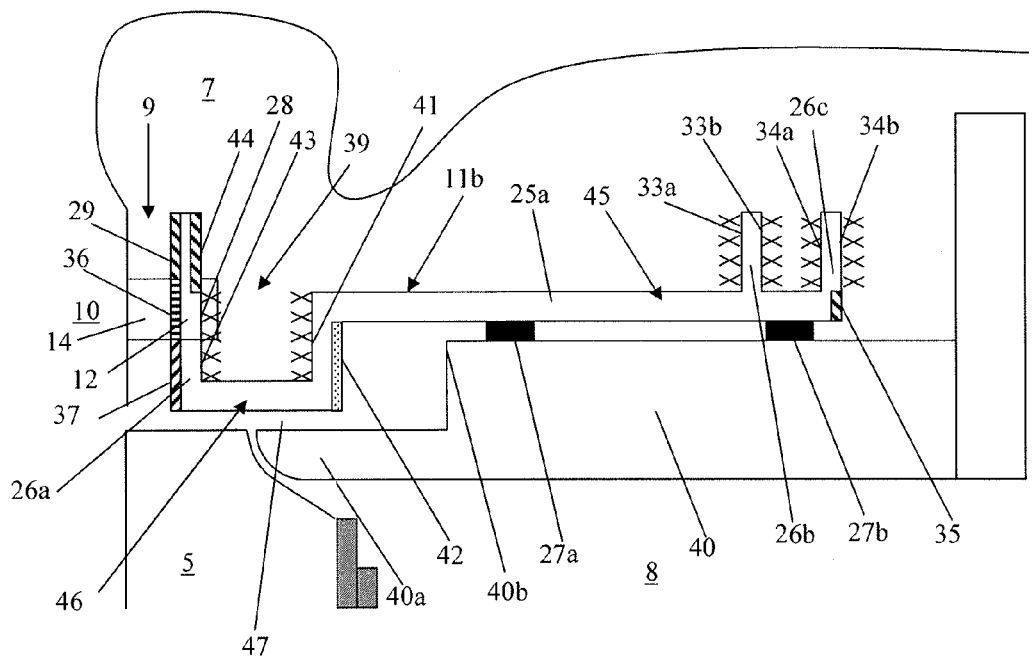
FIG. 3 shows a schematic cross-sectional view of a portion of a turbine according to an embodiment of the present invention.
Figure 4:
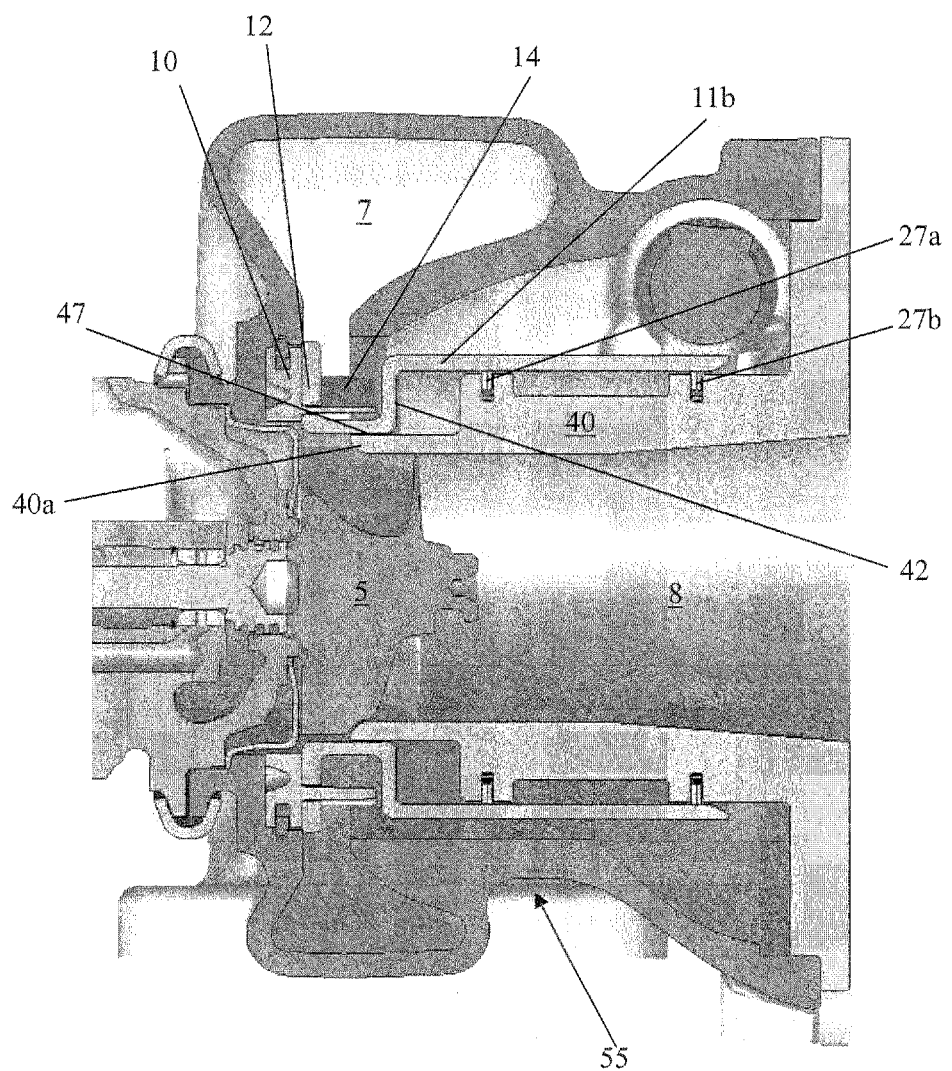
FIG. 4 shows a cross sectional view of a turbine according to the embodiment of the invention shown in FIG. 3.

FIG. 3 shows a schematic cross-sectional view of a portion of a turbine according to an embodiment of the present invention. Equivalent features within this embodiment of the invention to those of the turbine shown in FIG. 2 are given the same numbering. The turbine shown in FIGS. 3 to 8 comprises an annular movable wall member 11b. The movable wall member 11b has a main body 25a. At a first end of the main body 25a which is closest to the turbine wheel 5 there is an annular shroud portion 39 which has a generally U-shaped cross-section. A first side of the U-shaped shroud portion 39 is connected to the main body 25a, whilst a second side of the U-shaped shroud portion 39 forms a flange 26a of the movable wall member 11b. The flange 26a comprises an annular shroud 12. First and second axially spaced arms 26b and 26c which extend radially outwards from the main body 25a are provided at the other end of the main body 25a, at an opposite end to the shroud portion 39.

The turbine has a nozzle ring 10 which faces the shroud 12. An inlet passageway 9 is defined between the nozzle ring 10 and shroud 12. Vanes 14 extend generally axially across the inlet passageway 9 from the nozzle ring 10. The vanes 14 are received by suitably positioned and shaped apertures (not shown) in the shroud 12. The movable wall member 11b is mounted within the turbine such that it can move axially relative to the nozzle ring 10 to thereby vary the size of the inlet passageway 9. The movable wall member 11b is mounted to an annular wall 40 which is located radially inside of the movable wall member 11b. Two annular seals 27a and 27b provide a seal between the movable wall member 11b and the annular wall 40 so that substantially no gas can pass between the movable wall member 11b and the annular wall 40 at the location of the seals 27a, 27b. The seals are supported by annular grooves (not shown) in the annular wall 40.

The annular wall 40 may be connected to the turbine housing (not shown) or may be integral therewith. The annular wall 40 is shaped so that the profile of a radially inner surface 40a of the annular wall 40 (which is located adjacent the turbine wheel 5) corresponds to the outer profile of the turbine wheel 5. As previously discussed, this helps to minimise any gas leakage which may occur around the turbine wheel 5 from the inlet passageway 9 to the outlet 8. A radially outer surface 40b of the annular wall 40 has a profile which corresponds to that of the movable member 11b. This ensures that the U-shaped shroud portion 39 can be accommodated by the annular wall 40 to enable axial movement of the movable wall member 11b.

As described in relation to the turbine shown in FIG. 2, the pressure of the gas supplied by the inlet volute 7 to a first gas region upstream of the nozzle vanes is a first pressure. The pressure of the gas within the inlet passageway in the vicinity of the vanes is a second pressure. The pressure of the gas within the inlet passageway downstream of the inlet vanes is a third pressure. The pressure of the gas downstream of the inlet passageway, but upstream of the outlet passage way is a fourth pressure and the pressure of the gas in the outlet passageway is a fifth pressure. It will be appreciated that the first pressure is greater than the second pressure, the second pressure is greater than the third pressure, the third pressure is greater than the fourth pressure, and the fourth pressure is greater than the fifth pressure.

Compared to the movable wall member 11a shown in FIG. 2, the movable wall member 11b of FIG. 3 has two additional radial surfaces, due to the U-shaped shroud portion 39 of the movable wall member 11b. These additional surfaces are radial surface 41 which faces the nozzle ring 10 (i.e. is forward facing) and is in flow communication with the relatively high pressure gas of the inlet volute 7 (i.e. gas at the first pressure); and radial surface 42 which faces away from the nozzle ring 10 (i.e. is rear facing) and is on the radially inner most side of the movable wall member 11b. The surface 42 is in flow communication with a portion of the turbine which is downstream of the inlet passageway 9, but upstream of the turbine outlet 8. It follows that surface 42 is in flow communication with gas which is at the fourth pressure. As previously mentioned, fourth pressure is a pressure which is lower than the third pressure of a downstream portion of the inlet passageway, but greater than the fifth pressure (which is the pressure of the gas in the outlet passageway 8.

As before, in order to determine what net force is exerted on the movable wall member 11b, the pressure and resulting force that each surface is exposed to must be considered. As before, opposing surfaces which have the same surface area and are exposed to the same pressure will be exposed to opposing forces that cancel each other out (i.e. collectively exert substantially no force on the movable member 11b). In this case, opposing surfaces 33a and 33b of the first arm 26b result in axial force cancellation. Opposing surfaces 34a and 34b of the second arm 26c also result in axial force cancellation. Finally, the surface 41 and opposing surface portion 43 (which is a portion of the rear facing surface 28 of the flange 26a) result in axial force cancellation. Once again, the regions that result in axial force cancellation are marked with crosses to aid clarity. Because the net force exerted by these surface portions on the movable wall member 11b is substantially zero, their collective contribution to the force which is exerted on the movable wall member 11b can be ignored. It follows that the surface portions which contribute to the force acting on the movable member 11b so as to urge the movable wall member 11b and shroud 12 away from the nozzle ring (thereby increasing the width of the inlet passageway 9) are surface portions 29, 36, and 37. The surfaces which contribute to the force urging the movable wall member 11b and hence shroud 12 towards the nozzle ring 10 (thereby decreasing the width of the inlet passageway 9) are surface 42, surface portion 35 and a portion 44 of the rear facing surface of the flange 26a of the movable wall member 11b. The surface portion 44 is defined by subtracting the area of the surface 41 from the area of the entire rearward facing surface 28 of the first arm 26a.

The force which acts to urge the movable member 11b towards the nozzle ring 10 can be determined by summing the product of the surface area of the surface 42 and the fourth pressure, the product of the surface area of surface portion 35 and the first pressure, and the product of the surface area of the surface portion 44 and the first pressure. The opposing force which acts to urge the movable wall member 11b away from the nozzle ring can be determined by summing the product of the surface area of surface portion 29 and the first pressure, the product of the surface area of surface portion 36 and second pressure, and the product of the surface area of surface portion 37 and the third pressure. The surface area of surface 42 is such that the force acting on surface 42, surface portion 35 and surface portion 44 (which urges the movable wall member 11b towards the nozzle ring 10) is less than the force acting on surface portion 29, surface portion 36 and surface portion 37 (which urges the movable wall member 11b away from the nozzle ring 10). It follows that the net force on the movable wall member 11b is in a direction which urges the movable wall member 11b away from the nozzle ring 10. Alternatively, in other embodiments, the area of the surface 42 could be such that the force acting to urge the movable member 11b towards the nozzle ring 10 is substantially equal to the force acting to urge the movable member 11b away from the nozzle ring 10. In these embodiments, the net axial force acting on the movable wall member 11b is substantially zero and hence the movable wall member is said to be balanced.

A magnitude of the force acting on the movable wall member 11b so as to urge it away from the nozzle ring 10 may be significantly less than the magnitude of the force urging the movable wall member 11a shown in FIG. 2 towards the nozzle ring 10. In some embodiments, there may be substantially no net force on the wall member 11b. This may mean that a smaller, less expensive and/or less complex actuator may be used to actuate the movable wall member. Furthermore the actuator may have greater control over the positioning of the movable wall member 11b. The ability to use a smaller (and also less powerful) actuator may enable the use of electronic actuators to actuate the movable member 11b as opposed to other actuator types, such as hydraulic or pneumatic actuators. Electronic actuators tend to be cheap and also easy to integrate with other electronic systems which form part of an engine.

Surface 42 can be considered to be an opposing surface to any of the surface portions 29, 36 and 37 of the first arm 26a of the movable member 11b. This is because the force exerted on surface 42 due to the pressure it is exposed to will urge the movable wall member 11b in the opposite axial direction to the force exerted on any of the surface portions 29, 36 and 37 due to the pressure they are exposed to. In other words, or additionally, the surface 42 faces in a different direction to surface portions 29, 36 and 37.

The movable wall member 11b may also be described as having two generally tubular portions 45 and 46 which have different radii. It will be appreciated that FIG. 3 only shows the top half of the cross-section of the turbine. The tubular portions in the shown embodiment are generally annular and are co-axial with the axis of rotation of the turbine wheel 5. The main body 25a of the movable member 11b is formed from tubular portion 45 which has a larger radius. The main body 25 of the movable member 11b (which is formed by tubular portion 45) is connected to a first end of tubular portion 46 (which has a smaller radius than tubular portion 45), by a generally radial connection portion which defines surface 42. The surface 42 is generally annular. A second end of the cylinder 46 is connected to the shroud 12. In some embodiments of the present invention it is desired for the radius of the tubular member 45 to be such that the radial position of the tubular portion 45 (and hence the main body 25) substantially corresponds with the radial position of the vanes 14. In some embodiments of the present invention, the radius of the tubular portion 45 will be greater than the radius of the radially innermost point of at least one of the vanes 14, and less than the radius of the radially outermost point of at least one of the vanes 14. It will be appreciated that in some embodiments of the invention the connection portion need not be radial, providing it connects the first and second generally tubular portions.

The turbine according to the present invention can be said to have a first gas region which comprises the portion of the inlet passageway 9 upstream of the vanes 14 and the inlet volute 7. It follows that at least a portion of both the front facing and rear facing surfaces of the flange 26a of the movable member 11b are in the first gas region (i.e. surface portions 29 and 44 respectively). In this case the pressure of the gas within all parts of the first gas region may be the first pressure. The surfaces 41, 33a, 33b, 34a, 34b and surface portion 35 are also in the first gas region. Alternatively, the turbine can be said to have a first gas region which comprises the inlet passageway 9 and the inlet volute 7. It follows that both the front facing and rear facing surfaces of the flange 26a of the movable member 11b are in the first gas region (i.e. surface portions 29, 36, 37 and surface 28 are in the first gas region). In this case the pressure of the gas at a particular location within the first gas region may be the first pressure, second pressure or third pressure. In this case, the surfaces 41, 33a, 33b, 34a, 34b and surface portion 35 are also in the first gas region. In both of these cases a portion of the first gas region is upstream of the inlet passageway 9. Furthermore, in both of these cases the first gas region includes at least a portion of the inlet passageway 9 (in the second case the first gas region includes all of the inlet passageway 9).

A second gas region extends from downstream of the inlet passageway 9 to the outlet passageway 8. In this case the pressure of gas within the second gas region may be the fourth pressure. In some cases the second gas region may extend from the portion of the inlet passageway 9 downstream of the vanes 14 to the outlet passageway 8. In this case the pressure of the gas at a particular location within the second gas region may be the third pressure or the second pressure.

A third gas region includes the outlet 8. The first, second and third gas regions may not overlap and may define distinct regions of the turbine. The surface 42 is part of the second or third gas region. In the embodiment of the invention shown it is in the second gas region. A gas region is a continuous volume, the gas at any location within the gas region being in flow communication with gas at any other location within the gas region. A surface which defines a portion of a gas region is said to be part of that gas region.

In the described embodiment of the present invention, the surfaces (or surface portions) which have a force exerted on them (due to gas pressure) that urges the movable wall member 11b to move axially are generally radial. This need not be the case. The surfaces may be inclined at any appropriate angle to the turbine axis and/or may be irregular, provided that the gas pressure can exert a force on the surfaces (or surface portions) that has a component which acts in the axial direction, and which can therefore urge the movable wall member to move in one direction or the other along the axis.

In the embodiment of the invention shown, the surface 42 is in flow communication with gas at the fourth pressure (also referred to as gas in the second gas region). As can be seen best in FIG. 4, surface 42 is placed into flow communication with gas at an intermediate pressure by a link passageway 47 which extends between wall 40 and movable wall member 11b. In the embodiment shown, surface 42 is not, and cannot, be in flow communication with the outlet passageway 8 (i.e. it does not and cannot form part of the third gas region). Likewise, in the embodiment shown, surface 42 is not, and cannot, be in flow communication with the inlet volute 7 (i.e. it does not and cannot form part of the first gas region).

Figure 5:
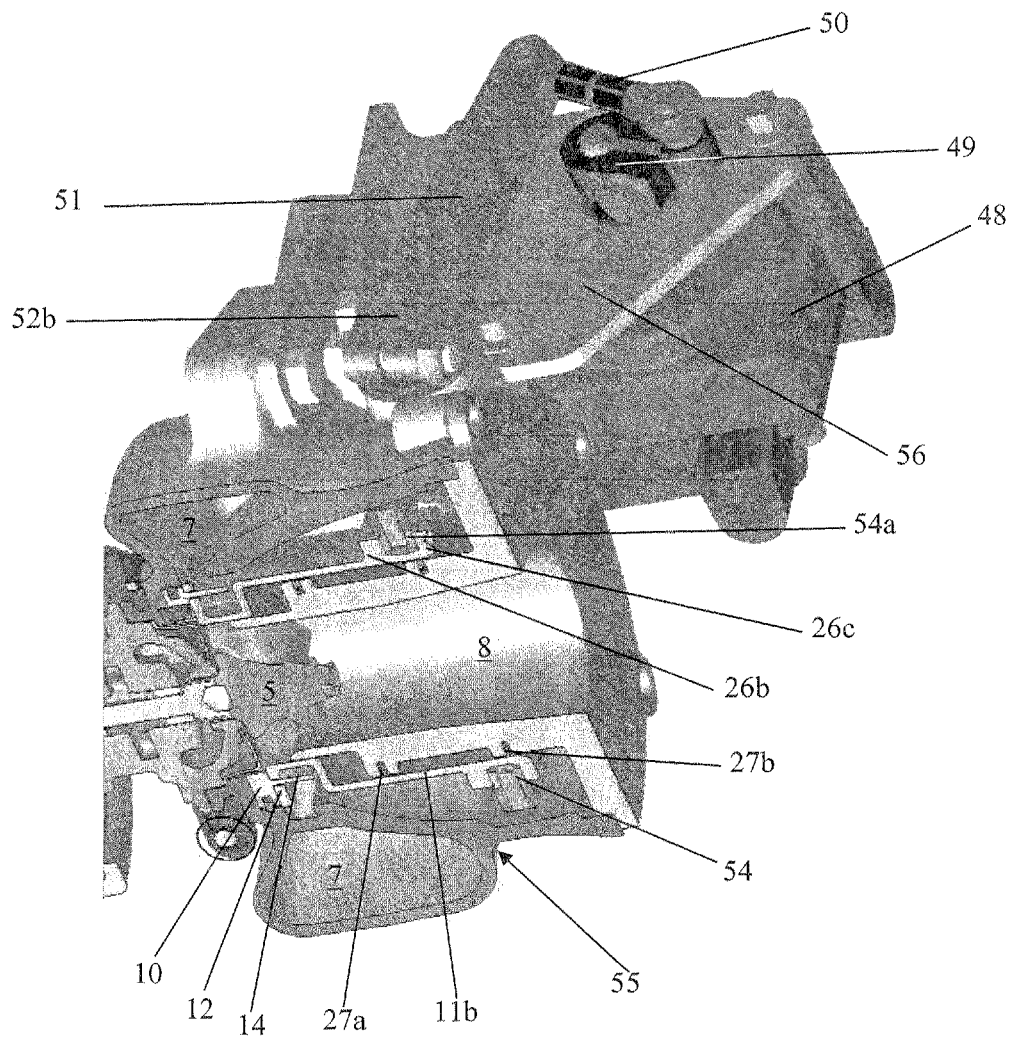
FIG. 5 shows a perspective view of the turbine shown in FIG. 4 with a portion of the turbine cut away for clarity.
Figure 6:
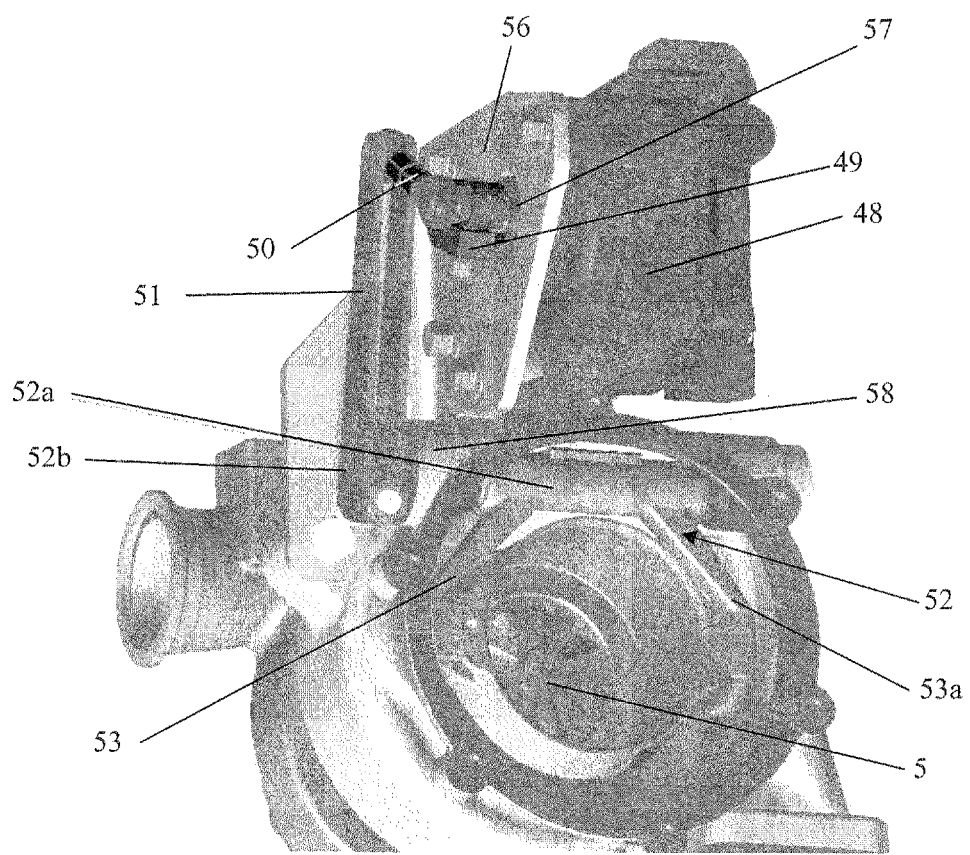
FIG. 6 shows a perspective view of a turbocharger having the turbine as shown in FIGS. 4 and 5.
Figure 7:
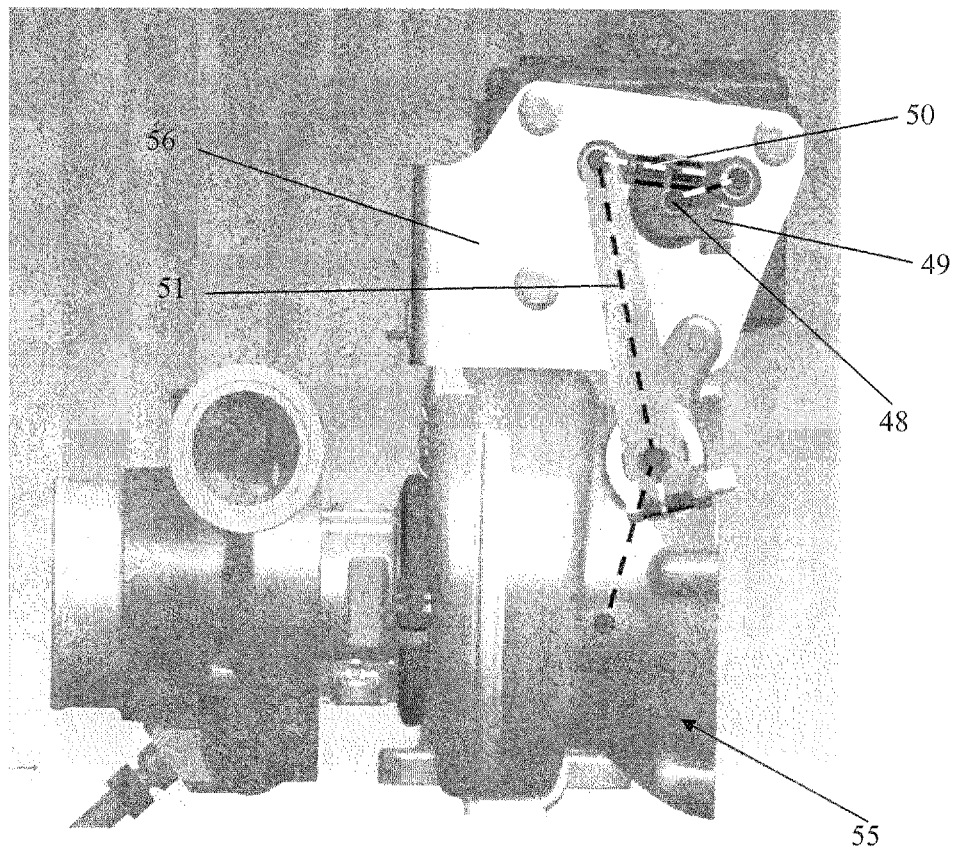
FIG. 7 shows a side elevation of the turbocharger shown in FIG. 6 with links and pivots of a linkage highlighted for clarity.

FIGS. 5 to 7 show an actuation linkage which is used to move the movable wall member 11b. The actuation linkage comprises a rotary actuator 48, a link connector 49, a first bar link 50, a second bar link 51 and a yoke member 52. The yoke member 52 is fixed on a separately formed shaft 52a that is received in journal bearings in the wall of the turbine housing 55. The shaft 52a is mounted such that it has an axis of rotation which is perpendicular to the turbine axis. The yoke member 52 can rotate with the shaft and defines two spaced apart arms 53, 53a which extend away from the shaft 52a on opposite sides of the turbine axis. The end of each arm 53, 53a of the yoke member 52 has a pin that extends into a sliding block 54, 54a that is in turn received between the first arm 26b and second arm 26c of the movable wall member 11b. The pin of each arm 53, 53a of the yoke member 52 pivotally connects each arm to the respective sliding block 54, 54a.

The shaft 52a of the yoke member 52 passes through the turbine housing via an aperture (not shown) in the turbine housing 55 such that an end 52b of the shaft 52a is outside the turbine housing. The end 52b of the shaft 52a is secured to a first end the second link bar 51. A second end of the second link bar 51 is pivotally connected to a first end of the first link bar 50. The pivotal connection between the first link bar 50 and second link bar 51 allows relative rotation between the two. A second end of the first link bar 50 is pivotally connected to a first end of the link connector 49, again so that relative rotation between the first link bar 50 and link connector 49 is possible. A second end of the link connector 49 is connected to a spindle of the actuator 48. The actuator 48 is secured to the turbine housing 55 by a mounting plate 56. The spindle of the actuator 48 passes through an aperture 57 in the mounting plate 56.

Figure 8:
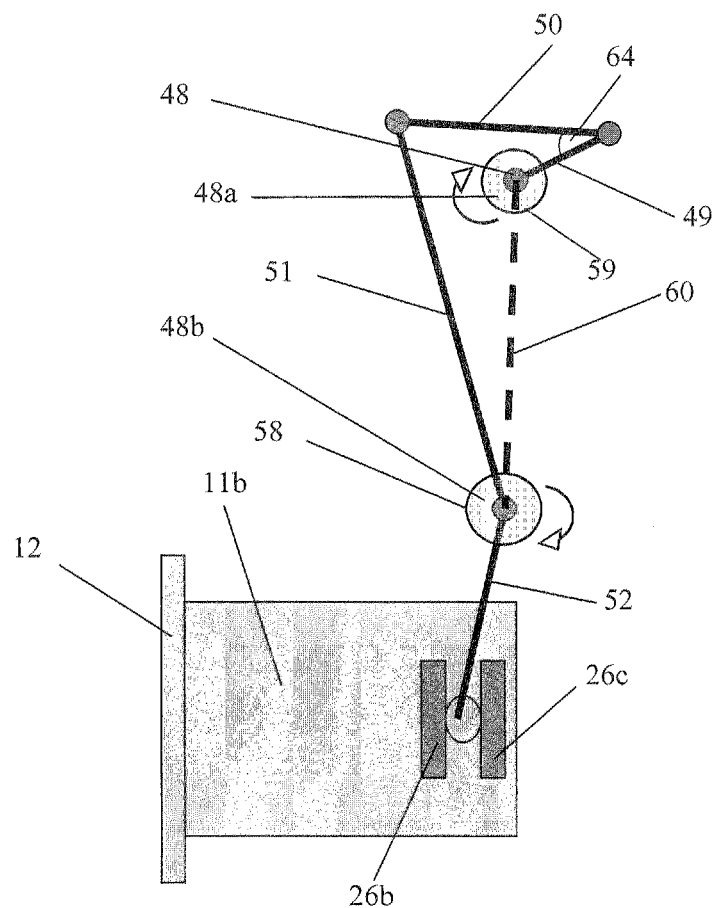
FIG. 8 shows a schematic view of the linkage shown in FIG. 7.

FIG. 8 shows a schematic representation of the linkage arrangement relative to the movable member 11b. It can be seen that the point at which the yoke member 52 passes through the turbine housing 45 forms a fixed point 58 which has a fixed position relative to fixed point 59 where the spindle of the actuator 48 passes through the fixing plate 56. The fixed positional relationship between points 58 and 59 is indicated by the dashed line 60.

If the actuator 48 is energised such that its spindle rotates in a clockwise direction as shown in FIG. 8, then this will cause the link connector 49 (which is fixedly connected to the actuator spindle) to also rotate in a clockwise direction about the axis of rotation of the actuator spindle. The pivotal connection between the link connector 49 and first link bar 50 (which enables relative rotation between the two in the plane of the figure shown in FIGS. 7 and 8) means that the rotation of the link connector 49 about the axis of rotation of the spindle of the actuator will be converted into a generally linear movement of the first link bar 50 towards the right as shown in FIG. 8. The pivotal link between the first link bar 50 and second link bar 51 (which allows relative rotation between the two in the plane of the figure shown in FIGS. 7 and 8) means that the generally linear motion of the first link bar 50 towards the right as shown in FIG. 8 is converted to a clockwise rotation (or pivoting) of the second link bar 51 about the fixed pivot point 58, (and hence the yoke member 52 which is fixedly attached to the second link bar 51).

The yoke member 52 pivots about the shaft of the yoke member 52 (which is pivotally connected to the fixed pivot point 58 of the turbine housing) about the axis of the shaft of the yoke member 52. This causes the pins on the arms of the yoke member 52 to describe an arc of a circle and that in turn causes the sliding blocks (not shown in FIG. 8) of each arm of the yoke member 52 to move axially and slide vertically within the channel defined between the radial arms 26*b* and 26*c* of the movable wall member 11*b*. In this case, rotation of the yoke member 52 about the fixed pivot point 58 in a clockwise direction within FIG. 8 causes the movable wall member 11*b* to be moved to the left in the figure. This may correspond to a movement of the movable wall member 11*b* towards the nozzle ring (not shown), i.e. in a direction which will narrow the width of the inlet passageway of the turbine. The sliding blocks (not shown in FIG. 8) which are received between the first and second arms 26*b* and 26*c* of the movable wall member 11*b* and which are pivotally connected to the yoke member 52 enable the rotation of the yoke member 52 about the fixed pivot point 58 to be converted into linear axial movement of the movable wall member 11*b* (i.e. parallel to the axis of rotation of the turbine wheel (not shown in FIG. 8)). It will be appreciated that rotation of the actuator spindle in a counter clockwise direction will, in a converse manner, result in the linear axial movement of the movable wall member 11*b* towards the right (as viewed in FIG. 8). This movement may correspond to the movement of the movable wall member 11*b* away from the nozzle ring (not shown) of the turbine and may hence increase the width of the inlet passageway of the turbine.

The linkage arrangement described above may be referred to as, or is, a four bar linkage. The first three "bars" (or link members) of the four bar linkage are the link connector 49, the first link bar 50 and the second link bar 51. The fourth link bar is a figurative link (indicated by the dashed line 60) between the pivot points 58 and 59 which have a fixed positional relationship.

In the embodiment of the invention shown the distance between the first and second ends of the link connector 49 is less than the distance between the first and second ends of the first link bar 50. Furthermore, the distance between the first and second ends of the first link bar 50 is less than the distance between the first and second ends of the second link bar 51. The distance between the pivot points 58 and 59 which form the figurative fourth link bar 60 is less than the distance between first and second ends of the second link bar 51, but more than the distance between first and second ends of the first link bar 50. It will be appreciated that any appropriate configuration of four bar linkage (for example the lengths of the four "bars" of the linkage) may be used.

The use of a four bar linkage to move the movable wall member 11*b* (as opposed to directly linking the yoke member to the actuator) will modify the load transmitted to the actuator 48 from the movable wall member 11*b* (and conversely the force exerted on the movable wall member 11*b* by the actuator). As previously discussed, there might be a net force acting on the movable wall member 11*b* due to the gas pressure acting on the surfaces of the movable wall member which are exposed to the gas, and this force will urge the movable wall member 11*b* away from the nozzle ring (i.e. to the right as shown in FIG. 8). The urging of the movable wall member 11*b* in this direction will result in the actuator 48 experiencing a counter clockwise (as viewed in FIG. 8) turning force or torque. The four bar linkage modifies the force exerted by the movable wall member 11*b* on the actuator 48 by converting some of the force (or load) on the movable wall member 11*b* that would otherwise be exerted as torque on the actuator into bearing loads which are borne by the fixed pivot points 48*a*, 48*b* and thus by the turbine housing and mounting plate (as opposed to the actuator itself). The four bar linkage of the present invention may reduce the force exerted by the movable wall member 11*b* on the actuator 48 (i.e. reduce the load on the actuator 48 due to the force exerted on the movable wall member 11*b*). For this reason, a less powerful (and hence possibly less expensive, smaller and/or lighter) actuator may be used.

Figure 9:
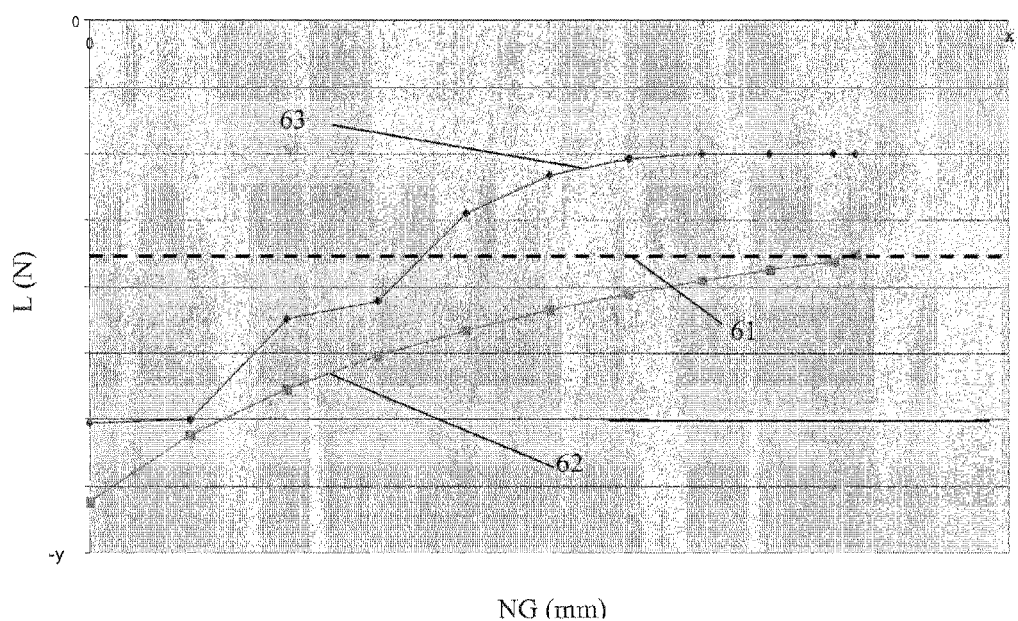
FIG. 9 shows a graph of load profiles of the load placed on an actuator by a movable wall member of the turbocharger shown in FIGS. 6 and 7, and of the theoretical load exerted by the actuator and linkage which forms part of the turbine shown in FIGS. 5 to 7 on a movable wall member.

Not only does the four bar linkage affect the force which is applied by the movable wall member 11*b* to the actuator, but it also affects the force that the actuator can apply to the movable wall member 11*b* via the linkage. FIG. 9 shows a graph of force (L) against nozzle gap (NG) (i.e. the distance between the nozzle ring and the shroud of turbine). The dashed line indicated by 61 shows the force exerted by an actuator which is connected directly to the yoke member (i.e. with no four bar linkage) as a function of the nozzle gap. It can be seen that the force exerted by the actuator on the movable wall member via the yoke member is substantially constant regardless of the nozzle gap. This may be disadvantageous in a situation where the force required to actuate the movable wall member varies as a function of the position of the movable wall member. For example, the force required to actuate the movable wall member may be a maximum when the width of the inlet passageway is a minimum. If the force required to actuate the movable wall member is greater than the force capability of the actuator at any position of the movable wall member (e.g. when the width of the inlet passageway is a minimum), then a larger actuator will be required. It is therefore desirable to use a linkage which will increase the force capability of the actuator so that a smaller, cheaper or less complex actuator can be used.

Curve 62 shows the theoretical force exerted by an actuator on the movable wall member when the actuator and movable wall member are connected by the four bar linkage previously described. In this case, the actuator is assumed to be capable of providing a constant torque. The curve 62 shows that the magnitude of the force which is exerted on the movable wall member by the actuator is a maximum when the nozzle gap is substantially zero. The magnitude of the force exerted on the movable wall member by the actuator then decreases with increasing nozzle gap. This behaviour, whereby the force exerted on the movable wall member by the actuator (per unit of actuator torque) varies as a function of the nozzle gap (and hence the position of the movable member) is referred to as non-linear. Hence the linkage, in this case a four bar linkage, which links the actuator to the movable wall member is referred to as a non-linear linkage. Other such linkages are possible, for example, different to that discussed above.

The four bar linkage increases the magnitude of the force that can be applied to the movable wall member by the actuator (per unit of actuator torque). Increasing the magnitude of the force which can be applied to the movable wall member per unit torque applied by the actuator will facilitate the use of a less powerful actuator to exert a given force on the movable wall member. Less powerful actuators may be beneficial as they may be cheaper, smaller in size and lighter. It follows that the ability to use a less powerful and/or cheaper actuator may lead to a reduction in the size and weight, or cost, of a turbine comprising such an actuator.

Curve 63 on the graph shows the measured load on an actuator of a turbine having a four bar linkage arrangement. It can be seen that the profile of the curve 63 is very similar to that of the non-linear response of the theoretical four bar linkage linked to an actuator shown by curve 62. It should be noted that it is preferable for the magnitude of the load placed on the actuator by the movable wall member via the four bar linkage to be less than the magnitude of the force that the actuator can exert on the movable wall member via the four bar linkage at any given nozzle gap. This is so that the actuator is capable of exerting sufficient torque to overcome the load on the actuator due to the force on the movable wall member 11b via the linkage at any position and thereby effect movement of the movable wall member 11b.

The extent of the non-linearity of the force that the actuator can apply to the movable wall member as a function of nozzle gap is dependent at least in part on the toggle angle between the link connector 49 and first link bar 50. The toggle angle can be seen best in FIG. 8 and is the angle 64 subtended between the link connector 49 and first link bar 50 about the pivotal connection in between the two. In general, and up to a point, the greater the toggle angle 64 the less force per unit torque of the actuator will be transmitted via the four bar linkage to the movable wall member 11b. The toggle angle 64 will change based on the position of the movable wall member 11b. For example, as the movable wall member 11b moves to the right as shown in FIG. 8, the toggle angle will increase. It has been found to be preferable for the toggle angle to be between 0° and about 25° when the movable wall member 11b is in its closed position. In some embodiments of the invention, the toggle angle may be between 0° and about 25° at any given position of the movable wall member 11b in use. In further preferable embodiments of the invention the toggle angle will be between about 15° and about 25° when the movable wall member 11b is in its closed position. It is also preferred that the toggle angle 64 increases as the movable wall member 11b moves away from the nozzle ring (i.e. in a direction which causes the width of the inlet passageway of the turbine to increase). This is because, in general, an increased toggle angle will result in the actuator being able to exert less force on the moveable member 11b. It follows that in certain embodiments, where the greatest force exerted on the movable wall member by the actuator and linkage is required when the wall member is closest the nozzle ring (and as such the force requirement on the actuator and linkage decreases as the nozzle decreases) then it is advantageous for the toggle angle to increase as the nozzle gap increases. In this manner the force exerted on the movable wall member by the actuator and linkage (which is dependent at least in part on the toggle angle) can generally match the changing (non-linear) force required to actuate the movable member as it moves so as to change the nozzle gap.

Whilst a four bar linkage has been shown as a means of obtaining a non-linear response from an actuator (i.e. where the force exerted by the actuator via the linkage on the movable wall member changes as a function of the position of the movable wall member) any appropriate means may be used in order to produce a non-linear response from an actuator. It is preferable that the force exerted by the actuator via the linkage on the movable wall member is a maximum when the width of the turbine inlet passageway is a minimum. This is because, in some embodiments the load exerted on the actuator via the linkage by the movable wall member is a maximum when the width of the inlet passageway is a minimum. It follows that the greatest force is required to be exerted by the actuator via the linkage on the movable wall member when the width of the inlet passageway is a minimum so that the force exerted by the actuator on the movable member is sufficient to overcome the load on the actuator and move the movable wall member. It is also preferable that the force exerted on the movable wall member by the actuator via the non-linear linkage has a profile which is similar in shape and magnitude to that of the load placed on the actuator via the linkage by the movable wall member.

Numerous modifications and variations may be made to the exemplary design described above without departing from the scope of the invention as defined in the claims.

Furthermore, whilst the variable geometry turbine described forms part of a variable geometry turbocharger, it will be appreciated that this need not be the case. For example, the variable geometry turbine may be linked to a crankshaft and/or gear which transmits mechanical power to a flywheel or a power generating device.

While the invention has been illustrated and described in detail in the drawings and foregoing description, the same is to be considered as illustrative and not restrictive in character, it being understood that only the preferred embodiments have been shown and described and that all changes and modifications that come within the scope of the inventions as defined in the claims are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A variable geometry turbine comprising:
a turbine wheel mounted within a housing for rotation about a turbine axis; and
flow control passage upstream of said turbine wheel, the gas flow control passage being defined at least in part between a radial first surface of a movable wall member and a facing wall of the housing, the movable wall member also comprising second and third surfaces which oppose the first surface, the movable wall member being movable in an axial direction so as to vary the size of the gas flow control passage;
there being a first gas region of the turbine, a portion of which is upstream of the gas flow control passage, the first gas region including at least a portion of the gas flow control passage; a second gas region of the turbine downstream of the gas flow control passage which contains the turbine wheel; and a third gas region of the turbine downstream of the turbine wheel; wherein the first gas region comprises the first and second surfaces, and the second gas region or third gas region comprises the third surface.

2. A variable geometry turbine according to claim 1, wherein the second gas region comprises the third surface and wherein, in use, the pressure in the second gas region is intermediate the pressure in the first and third gas regions.

3. A variable geometry turbine according to claim 1, additionally comprising gas flow control vanes which extend from the facing wall of the housing at least part way across the gas flow control passage; and wherein the movable wall member comprises a shroud plate, the shroud plate having a plurality of apertures, each aperture corresponding to a gas flow control vane and being configured such that, in use, it can receive the corresponding gas flow control vane.

4. A variable geometry turbine according to claim 1, wherein the movable wall member comprises a first substantially tubular portion, a second substantially tubular portion and an arm, the radius of the first substantially tubular portion being greater than the radius of the second substantially tubular portion, wherein a connection portion joins a first end of the first substantially tubular portion with a first end of the second substantially tubular portion; wherein the arm extends radially outboard of the second substantially tubular member from a second end of the second substantially tubular portion; wherein the radial first surface is defined by the arm, the second surface is defined by the arm, and wherein the third surface is defined by the connection portion.

5. A variable geometry turbine according to claim 1, wherein the variable geometry turbine additionally comprises gas flow control vanes which extend from the facing wall of the housing at least part way across the gas flow control passage; and wherein the movable wall member comprises a shroud plate, the shroud plate having a plurality of apertures, each aperture corresponding to a gas flow control vane and being configured such that, in use, it can receive the corresponding gas flow control vane,
  wherein the movable wall member comprises a first substantially tubular portion, a second substantially tubular portion and an arm, the radius of the first substantially tubular portion being greater than the radius of the second substantially tubular portion,
  wherein a connection portion joins a first end of the first substantially tubular portion with a first end of the second substantially tubular portion; wherein the arm extends radially outboard of the second substantially tubular member from a second end of the second substantially tubular portion; wherein the radial first surface is defined by the arm, the second surface is defined by the arm, and wherein the third surface is defined by the connection portion, and
  wherein the radius of the first substantially tubular portion is greater than the radius of the radially innermost point of at least one of the gas flow control vanes; and the radius of the first substantially tubular portion is less than the radius of the radially outermost point of at least one of the gas flow control vanes.

6. A variable geometry turbine according to claim 1, wherein the second gas region comprises the third surface and wherein the second gas region further comprises a link passageway, a first end of which is in gas flow communication with the turbine wheel and a second end of which is in gas flow communication with the third surface.

7. A variable geometry turbine according to claim 6, wherein the link passageway is defined between the movable wall member and a fixed annular wall portion of the housing.

8. A variable geometry turbine according to claim 1, additionally comprising a gas flow control mechanism operable to move the movable member to control gas flow through said gas flow control passage; the gas flow control mechanism comprising a non-linear linkage for connection between an actuator and the movable wall member.

9. A variable geometry turbine according to claim 8, wherein the gas flow control mechanism is located at least in part within the housing.

10. A variable geometry turbine according to claim 8, wherein the linkage is a four bar linkage.

11. A variable geometry turbine according to claim 10, wherein the linkage comprises a first link member, a second link member and a third link member; a first end of the first link member being fixedly linked to the actuator and a second end of the first link member being pivotally linked to a first end of the second link member, such that the first link member and second link member can rotate relative to one another; a second end of the second link member being pivotally linked to a first end of the third link member, such that the second link member and third link member can rotate relative to one another; a second end of the third link member being fixedly linked to a yoke member which is configured to axially move the movable wall member; wherein there is a constant fixed positional relationship between the first end of the first link member and the second end of the third link member.

12. A variable geometry turbine according to claim 11, wherein the distance between the first and second ends of the first link member is less than the distance between the first and second ends of the third link member; and optionally wherein the distance between the first and second ends of the first link member is less than the distance between the first and second ends of the second link member, and the distance between the first and second ends of the second link member is less than the distance between the first and second ends of the third link member.

13. A variable geometry turbine according to claim 11, wherein a toggle angle subtended by the first and second link members about the pivotal link between the first and second link members is between at least one of
  0° and about 25°, and
  about 15° and about 25°,
  when the movable wall member is in a closed position.

14. A variable geometry turbine according to claim 8, wherein the non-linear linkage is configured such that the force exerted on the movable wall member by the actuator per unit of torque of the actuator increases as the separation between the radial first surface of a movable wall member and a facing wall of the housing decreases.

15. A variable geometry turbine according to claim 1, wherein the surface area of the third surface is configured such that, in use, the net force acting on the movable wall member due to gas pressure acting on the movable wall member is substantially zero or urges the first surface of the movable wall member away from the facing wall of the housing.

16. A variable geometry turbine according to claim 1, wherein the first gas region comprises a turbine inlet volute and wherein the third gas region comprises a turbine outlet passageway.

17. A variable geometry turbine according to claim 1, further comprising an annular wall member having a radially inner surface which has a profile which corresponds to the outer profile of the turbine wheel and a radially outer surface which has a profile which corresponds to the profile of the third surface.

18. A turbocharger comprising a variable geometry turbine according to claim 1.

19. A method of manufacturing or designing a variable geometry turbine according to claim 1 or a turbocharger according to claim 18, wherein the method comprises calculating a surface area of the third surface such that, in use, the net force acting on the movable member due to gas pressure acting on the movable wall member is substantially zero or urges the first surface of the movable wall member away from the facing wall of the housing.

20. A method of manufacturing or designing a variable geometry turbine according to claim 19, further comprising forming the third surface with the calculated surface area.

\* \* \* \* \*